United States Patent [19]

Stolfo et al.

[11] Patent Number: 5,563,783
[45] Date of Patent: Oct. 8, 1996

[54] METHOD AND SYSTEM FOR SECURITIES POOL ALLOCATION

[75] Inventors: Salvatore J. Stolfo, Ridgewood, N.J.; Yechiam Yemini, Briarcliff Manor, N.Y.; Eugene Pinsky, Brookline, Mass.

[73] Assignee: The Trustees of Columbia University in the City of New York, Morningside Heights, N.Y.

[21] Appl. No.: 416,493

[22] Filed: Apr. 4, 1995

Related U.S. Application Data

[63] Continuation of Ser. No. 882,264, May 13, 1992, abandoned.

[51] Int. Cl.$^6$ ................................................. G06F 153/00
[52] U.S. Cl. ........................................ 364/408; 364/401 R
[58] Field of Search ................................... 364/406, 408, 364/648, 401

[56] References Cited

U.S. PATENT DOCUMENTS

| | | | |
|---|---|---|---|
| 4,677,552 | 6/1987 | Sibley, Jr. ................................. | 364/408 |
| 5,101,353 | 3/1992 | Lupien et al. ............................ | 364/408 |

OTHER PUBLICATIONS

"The N–City Travelling Salesman Problem: Statistical Mechanics and the Metropolis Algorithm*" by Ernesto Bonomi and Jean–Luc Lutton, SIAM Review, vol. 26, No. 4, Oct. 1984.

"Concepts of Scale in Simulated Annealing" by Steve R. White, IBM Thomas J. Watson Research Center, 1984.

"Simulated Annealing: Theory and Applications" by P. J. M. van Laarhoven and E. H. L. Aarts, D. Reidel Publishing Company, Library of Congress Cataloging in Publication Data.

"Equation of State Calculations by Fast Computing Machines" by N. Metropolis, A. W. Rosenbluth, M. N. Rosenbluth, A. H. Teller and E. Teller. The Journal of Chemical Physics, vol. 21, No. 6, Jun. 1953.

"Optimization by Simulated Annealing" by S. Kirkpatrick, C. D. Gelatt, Jr., M. P. Vecchi. Science, May 13, 1983, vol. 220, No. 4598.

"The C Programming Language" by B. W. Kernighan and D. M. Ritchie. Prentice–Hall, Inc., 1978.

"Programming Expert Systems in OPS5" by L. Brownston, R. Farrell, E. Kant and N. Martin. Addison–Wesley Publishing Company, Inc., 1986.

"Mortgage Pass–through Securities: Ginnie Maes, Fannie Maes, and Freddie Macs" M. Stigum et al., The Dow Jones–Irwin Guide to Bond and Money Market Investments, Dow Jones–Irwin, 1987.

*Primary Examiner*—Donald E. McElheny, Jr.
*Assistant Examiner*—Frantzy Poinvil
*Attorney, Agent, or Firm*—Brumbaugh, Graves, Donohue & Raymond

[57] ABSTRACT

Trading in pooled securities (e.g., pooled mortgages) requires allocation of securities from pools to contracts subject to certain rules or constraints. To improve upon manual allocation procedures, computer techniques for fast and profitable allocation have been developed. Advantageously, a locally optimal allocation can be found by a rule-based greedy algorithm, and the locally optimal allocation can be improved upon further by a simulated annealing technique which is more likely to produce a globally optimal allocation.

23 Claims, 1 Drawing Sheet

Microfiche Appendix Included
(80 Microfiche, 1 Pages)

METHOD AND SYSTEM FOR SECURITIES POOL ALLOCATION

This application is a continuation application Ser. No. 07/882,264 filed May 13, 1992, now abandoned.

SPECIFICATION

A Microfiche Appendix hereto includes 1 microfiche with 80 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to computerized trading of securities and, more particularly, to computerized optimization of allocation of securities from pools to contracts.

A mortgage-backed security is an undivided interest in a set or "pool" of mortgages. These securities are issued primarily by agencies such as the Government National Mortgage Association (GNMA), the Federal Home Loan Mortgage Corporation (FHLMC), and the Federal National Mortgage Association (FNMA). For a general discussion of mortgage-backed securities, see, e.g., M. Stigum et al., "Mortgage Pass-Through Securities: Ginnie Maes, Fannie Maes and Freddie Macs", in *The Dow Jones-Irwin Guide to Bond and Money Market Investments*, Dow Jones-Irwin, 1987, pp. 241–258.

Typically, a professional trader handles a large number of mortgage-backed securities and of buy/sell contracts, and the trader's assigning or allocating of securities from pools to contracts is subject to numerous constraints in the form of rules published by the Public Securities Association (PSA). To the trader the problem is to find the most profitable allocation without violating any PSA rule, and mindful of certain preferences, e.g., pool quality ranking and the composition of residual pool inventory.

Most buy/sell contracts are "forward contracts" (i.e., for future delivery) which are filled or allocated monthly on a specific settlement day or "pool day"; for each type of security there is a designated date. The traders maintain an inventory of securities from which orders may be satisfied. Since only a small amount of pool information is available at the beginning of a pool day, only a small number of sell contracts can be pre-allocated. As pre-allocation information is communicated among traders, additional sell contracts may be allocated from the incoming buy contracts.

Under the PSA rules it is financially advantageous to the trader to postpone the allocation process to as short a time as possible before the pool-day deadline. As a result, most of the allocations occur in a rush at the end of the pool day. The sheer volume of these transactions may prevent a trader from performing a detailed analysis, resulting in sub-optimal allocations. And, even though it may be advantageous to re-allocate pools in the process due to changing market conditions, the cost of doing this manually may be too high. The problem then is to design efficient computer methods for allocating security interests from pools to contracts.

SUMMARY OF THE INVENTION

Security interests are allocated subject to constraints, and so as to maximize profit and/or minimize cost. A locally optimal allocation, found by a rule-based implementation of a so-called greedy algorithm, can be improved upon further by a simulated annealing technique which is more likely to produce a globally optimal allocation.

DETAILED DESCRIPTION OF PREFERRED EMBODIMENTS

Formulation of the Allocation Problem

Figure 1:
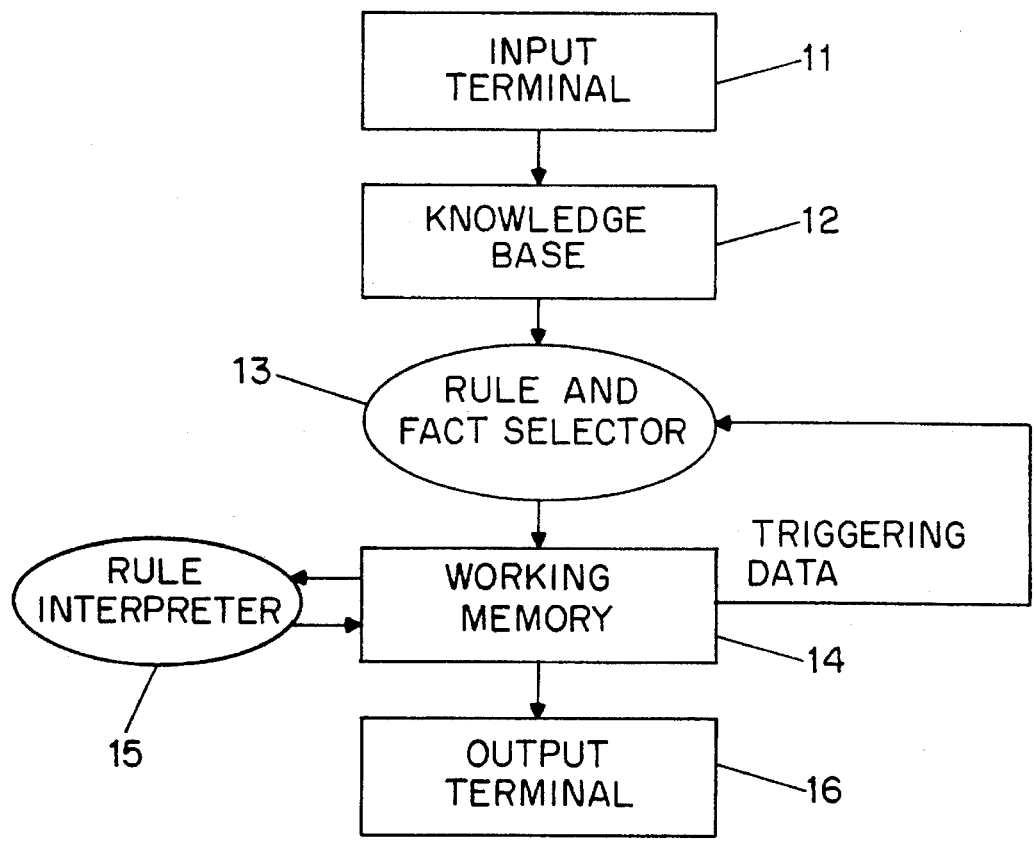
FIG. 1 is a schematic representation of a rule-based computer system for effecting a preferred first securities allocation method. In the Microfiche Appendix herein incorporated by reference, frames A1 through A39 show exemplary source code for this first technique.

A mortgage pool, P, includes mortgages assembled by an originator as the basis for a security. A pool is issued at "original face value" or "par value" here denoted by Par_Value(P). The outstanding principal balance of the underlying mortgages is known as the "current face value", Cur_Value(P); this value may be computed by multiplying the par value by a conversion factor, Factor(P), which may vary over time. A periodical publication, the Bond Buyer Newsletter, publishes a Monthly Factor Report containing current lists of factors for GNMA, FNMA, and FHLMC securities. The mortgages underlying a pool have a common stated annual percentage rate of interest, Coupon_Rate(P). For example, if P is a 10% GNMA pool with an original face value of $800,000 and a conversion factor of 0.99, then Par_Value (P)=$800 000, Coupon_Rate (P)=10% Factor(P)=0.99, and Cur_Value (P)=Par_Value(P)·Factor(P)= $792,000. As pools are split in the course of trading, some pools may become too small. Very small pools or "pool fragments" (namely those having a value less than $25,000) cannot be included in deliveries, they become nonliquid assets, and are sold under stipulated trades to small investors for little or no profit.

The basic unit of trading is a $1,000,000-contract. A contract of less than $1,000,000 is called an "odd lot". The PSA Rules specify pool composition in terms of contract "millions"; for example, in the case of a contract in the amount of $5,550,000, a permissible allocation involves five millions and one $550,000 odd lot. A legally allocated $1,000,000-contract is called a "good million". Without loss of generality it may be assumed that contracts amount to $1,000,000 or to a fraction of $1,000,000. For a contract, C, the following notation will be used here: Amount(C) for the stated nominal contract amount, Price(C) for an agreed-upon contract price, and Market Price(C) for the current market price.

Under the PSA Rules it is permissible for a trader to deliver more or less than the nominal contract amount; indeed, the trader's profit (or loss) depends on the difference between the nominal amount and the amount actually delivered. For example, in the case of a $1,000,000 sell contract for 10%-GNMA's (i.e., Amount(C)=$1,000,000) with agreed-upon price of $950,000 (i.e., Price(C)=$950,000): if, on settlement day, Market_Price(C)=$940,000, a trader will realize a maximized profit upon delivery of an amount which is as large as possible and permissible. This is called a "high tail" contract, involving the delivery of more than the specified amount. In the present case the PSA Rules permit the delivery of a maximum of $1,024,999.99, resulting in a profit to the trader of ($1,024,999.99−$1,000,000.00). ($950,000−$940,000)/$1,000,000=$24,999.99 (0.95−0.94)=$250.

On the other hand, if the market price is greater than the agreed-upon price, e.g., in the present case, Market_Price(C)=$980,000 instead of $940,000, it will be desirable to deliver as little of the security as possible. This is called a "low tail" contract, involving the delivery of less than the specified amount. In this case the optimal delivery under PSA guidelines is $975,000.01, with a minimized loss to the trader of $24,999.99·(0.98−0.95)=$750. In the general case, the amount Desired(C) which the trader desires to deliver is:

| | |
|---|---|
| Amount(C) | if Price(C) = Market_Price(C), |
| 1.02499999 · Amount(C) | if Price(C) > Market_Price(C), |
| 0.97500001 · Amount(C) | if Price(C) < Market_Price(C). |

The key PSA rules which apply to mortgage-backed securities trading can be summarized as follows:

(1) Securities in a pool must have identical coupon rates, and they must be issued by the same agency.

(2) Sellers may deliver up to ±2.499999% of the value of a contract.

(3) For coupon rates greater than or equal to 12%, a maximum of four pools may be used per delivery of $1,000,000, a maximum of three pools may be used to deliver an odd lot in a contract C if $500,000<Amount(C)<$1,000,000, and a maximum of two pools for an odd lot if 0<Amount(C)≦$500,000.

(4) For coupon rates less than 12%, a maximum of three pools may be used for the delivery of $1,000,000; a maximum of two pools may be used to deliver an odd lot if $500,000<Amount(C)<$1,000,000; and exactly one pool may be used for an odd lot if Amount(C)≦$500,000.

(5) For contracts filled with more than one pool, no proper subset of those pools may fall within the allowable variance of the contract.

If Max_Pools Allowed(C) is defined as the maximum number of pools that can be used to satisfy a contract C under Rules 3 and 4, then Max_Pools_Allowed(C) may have the following values:
1, if 0<Amount(C)≦$500,000 and Coupon_Rate<12%,
2, if $500,000<Amount(C)<$1,000,000 and Coupon_Rate<12%,
3, if Amount(C)=$1,000,000 and Coupon_Rate<12%,
2, if 0<Amount(C)≦$500,000 and Coupon_Rate≧12%,
3, if $500,000<Amount(C)<$1,000,000 and Coupon_Rate≧12%,
4, if Amount(C)=$1,000,000 and Coupon_Rate≧12%.

These rules apply to contracts involving GNMA, FHLMC, or FNMA pools. In the case of GNMA pools, additional constraints apply: GNMA pools must be split into multiples of $5,000 in terms of their par value. If a pool P is created from existing mortgages such that its par value is not an exact multiple of $5,000, the pool is said to have a tail, Tail(P), i.e., an amount which is a fraction of $5,000. Such a tail exists for the lifetime of a pool. This tail cannot be split, and no more than one tail can be used for any one contract.

The operation of these rules is illustrated in the following examples, assuming the allocation of 10% GNMA mortgage pools to satisfy hypothetical contracts. Pools and contracts will be numbered for identification; the i-th pool will be denoted by $P_i$. Contracts will be similarly numbered, with $C_j$ denoting the j-th contract.

Three pools, $P_1, P_2, P_3$, are assumed to be in the inventory as follows:

| Pool | Par Value | Tail | Factor | Current Face |
|---|---|---|---|---|
| $P_1$ | $800,000.00 | $0.00 | 0.99 | $792,000.00 |
| $P_2$ | $658,000.00 | $3,000.00 | 0.98 | $644,840.00 |
| $P_3$ | $525,480.30 | $480.30 | 0.97 | $509,715.89 |

EXAMPLE 1

For an odd-lot contract $C_1$ with Amount($C_1$)=Desired($C_1$)=$500,000, Max_Pools_Allowed($C_1$)=1 (Rule 4).

(a) The following constitutes a good delivery:

| Pool | Amount Delivered in Original Face | Amount Delivered in Current Face | |
|---|---|---|---|
| $P_1$ | $505,000.00 | $499,950.00 | |
| | | $499,950.00 | delivered |

It is noted that the delivered amount of $499,950.00 is within 2.499999% of the contract amount of $500,000.00 (Rule 2 is satisfied), no small pool fragments are left (as the remainder in pool $P_1$ has a par value of $295,000), and no tails were used and/or split.

(b) It might seem tempting to allocate as follows:

| Pool | Amount Delivered in Original Face | Amount Delivered in Current Face | |
|---|---|---|---|
| $P_3$ | $515,480.30 | $500,015.89 | |
| | | $500,015.89 | delivered |

As compared with the previously described allocation from $P_1$, this allocation gives a value closer to the desired amount ($500,015.89 instead of $499,950.00). However, though legal under the PSA rules, this allocation leaves pool $P_3$ with an undesirable fragment of $10,000.

(c) The following allocation for the same contract illustrates an illegal allocation:

| Pool | Amount Delivered in Original Face | Amount Delivered in Current Face | |
|---|---|---|---|
| $P_1$ | $490,000.00 | $485,100.00 | |
| | | $476,713.02 | delivered |

This is illegal because the delivered amount of $476,713.02 is not within 2.499999% of the contract amount (Rule 2 is violated).

Example 2. It is assumed that Amount($C_2$)=$750,000 and Desired($C_2$)=1.02499999·Amount($C_2$)=$768,749.93.

(a) The following allocation:

| Pool | Amount Delivered in Original Face | Amount Delivered in Current Face |
|---|---|---|
| $P_1$ | $500,000.00 | $495,000.00 |
| $P_2$ | $275,000.00 | $269,500.00 |
| | | $764,500.00 delivered | constitutes a good delivery for this odd lot, as only two pools were used (Rule 4 is satisfied), the delivered amount of $764,500.00 is within 2.499999% of the contract amount of $750,000.00 (Rule 2 is satisfied), no pool fragments were created, and the original face values of the amounts used are multiples of $5,000.

(b) On the other hand, the following allocation for the same contract:

| Pool | Amount Delivered in Original Face | Amount Delivered in Current Face |
|---|---|---|
| $P_1$ | $270,000.00 | $263,300.00 |
| $P_2$ | $245,000.00 | $240,100.00 |
| $P_3$ | $265,300.00 | $257,341.00 |
| | | $764,741.00 delivered | is illegal. Although the delivered amount of $764,741.00 is within 2.499999% of the contract amount (and is, in fact, very close to the desired amount), more than two pools were used (Rule 4 is violated). Moreover, the original tail of $480.30 of pool $P_3$ is split.

Example 3. It is assumed that Amount($C_3$)=$1,000,000.00 and Desired($C_3$)=0.97500001·Amount($C_3$)=$975,000.01.

(a) The following allocation:

| Pool | Amount Delivered in Original Face | Amount Delivered in Current Face |
|---|---|---|
| $P_1$ | $620,000.00 | $613,800.00 |
| $P_2$ | $203,000.00 | $198,940.00 |
| $P_3$ | $170,000.00 | $164,900.00 |
| | | $977,640.00 delivered | is an example of a "good million", as the allocation satisfies the PSA rules, no pool fragments are generated, and only one tail (from pool $P_1$) is used.

(b) On the other hand, the following allocation:

| Pool | Amount Delivered in Original Face | Amount Delivered in Current Face |
|---|---|---|
| $P_2$ | $495,500.00 | $485,590.00 |
| $P_3$ | $505,480.30 | $490,315.89 |
| | | $975,905.89 delivered | is illegal because more than one tail is used (i.e., more than one pool is used with original face amount not a multiple of $5,000) and the tail of pool $P_2$ has been split. It is noted that, in this example, it is desirable to deliver as little as possible (optimally just $975,000.01), so that the second allocation would have been preferable; however, the constraints on tails prevent delivery of this amount.

An allocation can be defined as the specification of deliveries, specifying the amount from each pool $P_1, \ldots, P_m$ to satisfy the sell contracts $C_1, \ldots, C_n$. It is convenient to represent an allocation as a matrix A whose element $a_{i,j}$ is the amount used from the i-th mortgage pool to satisfy the j-th contract. The PSA rules then correspond to constraints on the rows and columns of A. With $\delta(x)$ defined as 1 if $x>0$, and 0 if $x=0$, the PSA rules or constraints can be stated as follows:

$$\sum_{i=1}^{m} \delta(a_{ij}) \leq \text{Max\_Pools\_Allowed}(C_j), 1 \leq j \leq n \quad (1)$$

$$\left| \sum_{i=1}^{m} a_{ij} - \text{Amount}(C_j) \right| \leq 0.02499999 \cdot \text{Amount}(C_j), 1 \leq j \leq n \quad (2)$$

$$\begin{array}{l} a_{ij} = 0 \\ \text{OR} \\ a_{ij} \geq \$25{,}000 \cdot \text{Factor}(P_i) \end{array} \quad 1 \leq j \leq n, 1 \leq i \leq m \quad (3)$$

$$\begin{array}{l} \text{Cur\_Value}(P_i) - \sum_{j=1}^{n} a_{ij} = 0 \\ \text{OR} \\ \text{Cur\_Value}(P_i) - \sum_{j=1}^{n} a_{ij} \geq \$25{,}000 \cdot \text{Factor}(P_i) \end{array} \quad 1 \leq i \leq m \quad (4)$$

$$\sum_{j=1}^{n} \delta(\text{Tail}(a_{ij}/\text{Factor}(P_i))) \leq 1, 1 \leq i \leq m \quad (5)$$

$$\begin{array}{l} \text{Tail}(a_{ij}/\text{Factor}(P_i)) = 0 \\ \text{OR} \\ \text{Tail}(a_{ij}/\text{Factor}(P_i)) = \text{Tail}(P_i/\text{Factor}(P_i)) \end{array} \quad 1 \leq i \leq m, 1 \leq j \leq n \quad (6)$$

$$a_{i_1 j} + \ldots + a_{i_k j} < 0.97500001 \cdot \text{Amount}(C_j), \quad (7)$$

$$1 \leq i_1 < \ldots < i_k \leq m, 1 \leq j < n, k < \sum_{i=1}^{m} \delta(a_{ij})$$

Inequality 1 is the constraint on the number of pools that can be used to satisfy a contract. Inequality 2 allows for the delivery of up to ±2.499999% of the value of a contract. Expression 3 says that each delivered pool amount must have a face value of at least $25,000. Expression 4 says that either a pool is totally used in the delivery of a contract, or else there remains at least $25,000 of the original face value. Inequality 5 specifies that not more than one tail may be used for any contract. Expression 6 prohibits splitting of a tail. Expression 7 says that no proper subset of pools allocated to a contract may produce an allowable variance from the contract amount.

The sell contracts $C_1, \ldots, C_n$, to be filled (having Amount($C_j$)≤$1,000,000.00 without loss of generality), can be divided into three disjoint groups with subscript sets H ("high"), E ("exact") and L ("low") as follows:

H={j: Desired($C_j$)=1.02499999·Amount($C_j$)}
E={j: Desired($C_j$)=Amount($C_j$)}
L={j: Desired($C_j$)=0.97500001·Amount($C_j$)}

In these terms, a basic allocation problem can be stated as a combinatorial optimization problem, calling for the computation of an allocation matrix A such that the value of an objective function Profit(A) =

$$\sum_{j \in H} \left( \sum_{i=1}^{m} a_{ij} - \text{Amount}(C_j) \right) + \sum_{j \in L} \left( \text{Amount}(C_j) - \sum_{i=1}^{m} a_{ij} \right)$$

is maximized subject to the constraints 1–7. A formulation involving minimization of cost rather than maximization of profit is readily obtainable by defining Cost(A)=−Profit(A). This problem may be complicated further, as additional terms may be included in the objective function, and/or additional constraints may be imposed, e.g., to express pool quality or to influence the composition of remainders in pools after allocation.

Greedy-Algorithm Expert-System Approach

A so-called greedy algorithm can be applied to this optimization problem, formulated for processing by a computerized rule-based or expert system.

An exemplary rule-based system, schematically shown in FIG. 1, includes an input terminal 11 (e.g., a keyboard, a disk or tape drive, or a communications link), memory means 12 and 14 which respectively may be referred to as knowledge base and working memory, processing means 13 and 15 which respectively may be referred to as selector and interpreter (or "inference engine"), and an output terminal 16 (e.g., a printer, display screen, graphics terminal, or communications link). The knowledge base includes representations of rules and of facts. Rules specify actions to be performed under certain triggering conditions. In the knowledge base and in working memory, facts are represented by relations and propositions. In operation, the inference engine interprets rules to draw inferences from facts in working memory, thereby altering the contents of the working memory.

Starting, e.g., with an empty allocation and an inventory of pools, a greedy algorithm produces a sequence of partial allocations each of which is superior to the preceding one in terms of profitability. The algorithm comes to a stop upon reaching a full allocation for which no (significantly) improved successor allocation can be found by application of an adopted search strategy.

For stepping from a current allocation to an improved allocation, one or several operators may be used. For example, an operator may simply call for the allocation of some portion of some pool in inventory to some contract whole million, subject to a large number of constraints that encode the PSA rules. An allocation so obtained may be accepted depending on whether, as a result, the current value of the objective function will change by a minimum desired amount or variance. Or, an operator can be defined that decrements two or three distinct pools and assigns the sum of the decrements to a single contract whole million provided a variance target is met.

In a prototype implementation, operators for computer processing were formulated on the basis of a heuristic strategy followed by professional securities traders as follows:

1. Allocate whole millions to the "best", i.e., most profitable contracts. Thus, allocations are first made to the best contracts, and, if there is insufficient inventory, it will be the "worst" contracts which will not be met.

2. Allocate single pools that make up an exact good million or an exact odd lot. This tends to reduce the size of the inventory and thereby the complexity of the search in subsequent steps.

3. From pairs or triples of the smallest pools first, allocate good millions. Using up small pieces leaves inventory with a reduced number of left-over small pool pieces.

4. If there are allocatable pools in inventory that do not pair with others to make a good million, split a pool to make a good million with them only as a last resort and only if the remainder after splitting is still allocatable. One simple way of representing this strategy is to split the largest pools first, thereby favoring the generation of large leftovers.

These heuristics are based entirely on local information, without any attempt at a best-possible choice at each step. What is assured, however, is that each application of a rule results in an allocation which conforms to the PSA rules. As a final stage, once no application of rules 1–4 results in an improvement, good millions may be swapped or exchanged between contracts. For example, if a good million having a current value of $1,023,500 has been allocated to a contract $C_1$, if a good million with a current value of $1,024,000 has been allocated to a contract $C_2$, and if $C_1$ is more profitable than $C_2$, then it will be profitable to exchange the two good millions.

The prototype implementation was formulated using a well-known rule-based programming language known as OPS5. Source code for this implementation can be found in the Microfiche Appendix herein incorporated by reference. For a description of the OPS5 language, see, e.g., L. Brownston et al., "Programming Expert Systems in OPS5: An Introduction to Rule-Based Programming", Addison Wesley, 1985.

As implemented, the program is embodied in three rule sets, respectively including: "control rules" which encode the described heuristic strategy; "fill rules" which encode the PSA guidelines for good delivery, and which allocate specific pools to specific contracts; and "report rules" according to which the details of a (partial) allocation to an individual contract are reported. This program organization is conducive to ready change of the heuristics, if desired, by rewriting of control rules, and without changing the fill and the report rules. Thus, conveniently, other partial allocation strategies can be implemented.

Data input consists of a description of a set of pools ("p-records"), a set of contracts ("c-records"), and the market price of the securities to be allocated from pools to contracts ("m-record"). The following three input sample unit records illustrate the input format:

m GNMA 9.000000 96.062500 01/03/91-14:29:26
c 3 50000000.00 SELL 98.515625 GNMA 9.000000 UNAS 30664.06
HIGH 0.02453125
p 153 934527.25 GNMA 9.000000 0.58407953 1600000.00 28539

The sample m-record indicates that the market price for GNMA 9% securities is $96.0625 as of a certain date and time. The sample c-record indicates a sell contract, No. 3, of $50,000,000 worth of GNMA 9% securities as "high tail". The contract price is $98.515625, its initial status is "unassigned", potential profit is $30,664.06, and the difference between market price and contract price is $2.453125. The sample p-record indicates a GNMA 9% pool, No. 153, with par value $934,527.25, face value $1,600,000, conversion factor 0.58407953, and originating with pool No. 28539.

Initially, the program deposits into working memory the "exact-one-pool" goal for finding, if possible, good millions with single pools that satisfy the variance bounds used for the allocation of a good million. Next comes a phase of searching for multiple pool combinations that satisfy the PSA rules. In this phase, the rule "two-pool-high-tail-combo" is operational. Sequencing through the combination rules is controlled by the control elements with goal names "combo-3" first, and "combo-2" second. If this "combo phase" is unproductive, the program proceeds to a mode of splitting pools to fill contracts. In this "splitting mode", three-pool combinations are tried first, i.e., two pools in working memory are combined with a third pool that is split to fill the currently needed good million. If no three-pool combinations with a single split are found, the program goes on to try to locate two pools, one of which is split. As a last resort, a single pool is split in isolation.

After splitting a pool the remainder piece is checked. If the value of this piece is less than a good million, the program goes back to the mode of searching for combinations; otherwise, the program remains in splitting mode. If none of the prior rules apply, the program checks to determine whether there is any more inventory available, through the control element "inventory", marked either as "more" or as "nil". After trying to fill a contract with a single-pool-split rule, the program checks if there is more inventory. If so, the program loads from inventory into working memory and continues searching.

When a contract has been completely filled, the program goes into "report mode" to sensitize the reporting rules to be executed next. The reporting rules produce to an interface the detailed assignments of pools to good millions for the current contract. During the process of filling a good million, pools assigned are removed from working memory to reduce the combinatorics of subsequent phases of the program. Contracts that are filled are similarly reported and removed from working memory.

The following represents sample output:
C 1360 SPEC 3000000.00 2925003.00
2 365 965164.64 366 9836.36 975001.00
2 365 25000.00 366 950001.00 975001.00
1 366 975001.00

The sample output shows that a $3,000,000 contract, No. 1360, was filled for an actual amount of $2,925,003, with three good millions, each having a value of $975,001. The first good million consists of two parts, a $965,164.64 piece from a pool identified as No. 365, and a $9,836.36 piece from a pool identified as No. 366. The second good million also consists of two parts, a $25,000.00 piece from pool No. 365, and a $950,001.00 piece from pool No. 366. The third good million consists of one part, a $975,001.00 piece from pool No. 366. Other output messages from the program are self-explanatory.

Though not feasible in OPS5, it would be desirable to specify to the rule interpreter to select the "best matching instance" of a rule, rather than simply the instance with the most recent information as dictated by the OPS5-conflict-resolution strategy. An "instance of a rule" is a specific collection of working memory literals that together satisfy the conditions of the rule in question. When, for example, the program is trying to match the "three-pool-high-tail-combo" rule, it would be preferable to select the instance whose total three-pool value is largest from among all the instances, or lowest in the case of low tails. In view of these and similar considerations it will be apparent to those skilled in the art that the performance of the algorithm, with respect to the quality of a final allocation as well as with respect to the time required in the process, depends on many specific choices and detailed features of an implementation, which those skilled in the art will know how to make from the foregoing description of a preferred rule-based greedy algorithm.

Simulated-Annealing Approach

While an allocation produced by a local, greedy-algorithm optimization technique may be used without modification, preferred further processing by so-called simulated annealing can be used to find an allocation which is more likely to be globally optimal. Simulated annealing can also be used with starting methods other than the described greedy algorithm. Indeed, a description of an alternative preferred technique for finding a starting allocation for simulated annealing is included below.

Figure 2:
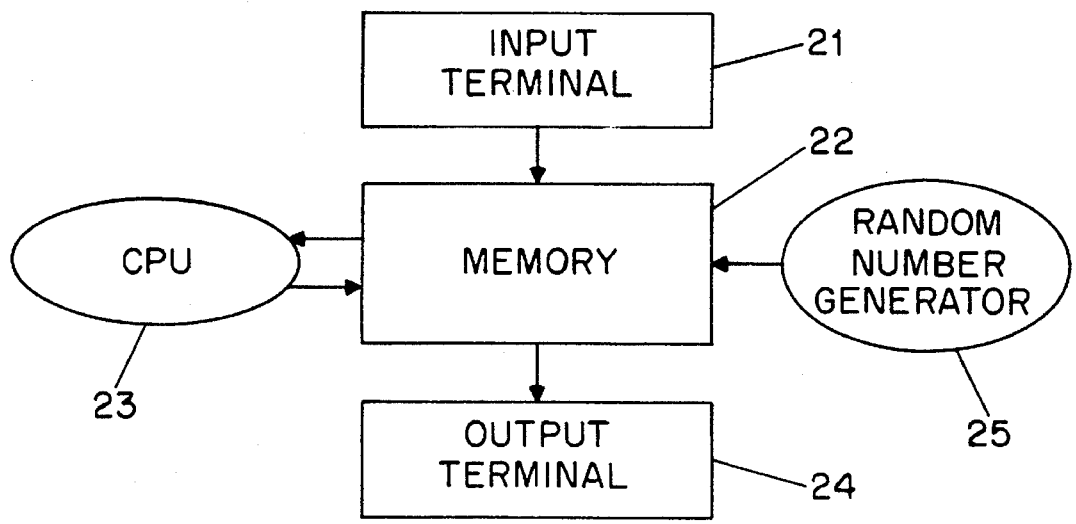
FIG. 2 is a schematic representation of a computer system for carrying out a preferred second securities allocation method. In the Microfiche Appendix herein incorporated by reference, frames B1 through B39 show exemplary source code for this second technique.

A conventional program-controlled computer system, schematically shown in FIG. 2, can be used to carry out simulated-annealing. Typically, such a system includes input means 21, processor means 23, and output means 24 connected to memory means 22 for data and for program storage. Also included is a random or pseudo-random number generator 25. Exemplary simulated-annealing source code is included in the Microfiche Appendix, programmed in "C". (A description of this programming language can be found, for example, in B. W. Kernighan et al., "The C Programming Language", Prentice-Hall, 1978.) Input and output data formats for the simulated-annealing program are the same as described above for the rule-based greedy-algorithm program, with different self-explanatory messages.

The simulated-annealing algorithm is designed for combinatorial optimization problems in which argument values are sought for an objective function to be minimized, subject to constraints on the arguments. As described, e.g., by S. Kirkpatrick et al., "Optimization by Simulated Annealing", Science, Vol. 220 (1983), pp. 671–680, this method is based on an analogy with physical annealing processing for producing a low-energy structural equilibrium state in a material; see also N. Metropolis et al., "Equation of State Calculations by Fast Computing Machines", Journal of Chemical Physics, Vol. 21 (1953), pp. 1087–1092. Annealing processing involves rapid heating and slow cooling of a material. Initially, at high temperatures, molecules move freely. Under slow cooling, thermal mobility is lost, and the material approaches a low-energy state, e.g., a crystalline or polycrystalline state. Analogously, in simulated annealing an objective or cost function (corresponding to energy) is sought to be minimized in a system of interest, and a control parameter (corresponding to temperature) is used in defining a degree of "mobility" in the production of states. Physical terms such as energy, temperature, heating, melting, cooling, and freezing are used in the following in a generalized sense as appropriate in view of the analogy with physical processing.

The Energy Function. More specifically with reference to mortgage pool allocation, using a matrix to represent an allocation, with matrix rows and columns subject to constraints, an objective or "energy" function can be defined as $$\text{energy}(A) = \text{cost}(A) + \text{pool\_quality}(A),$$

where $$\text{cost}(A) = \sum_{j \in H} \frac{1}{n} \left( 1 - \frac{\sum_{i=1}^{m} a_{ij} - \text{Amount}(C_j)}{\$25,000} \right) + \sum_{j \in L} \frac{1}{n} \left( 1 - \frac{\text{Amount}(C_j) - \sum_{i=1}^{m} a_{ij}}{\$25,000} \right)$$

and $$\text{pool\_quality}(A) = \sum_{i=1}^{m} \frac{w_i}{m} \frac{\sum_{j=1}^{n} a_{ij}}{\text{Cur\_value}(P_i)}$$

These definitions are suitable for finding legal allocations of minimum cost, thereby maximizing potential profit from using the ±2.499999% variance rule. Also, by means of weights $w_j$, $0 \leq w_j \leq 1$, a degree of pool desirability can be expressed, e.g., to favor pools with large face value as they are easier to split, or to favor recently issued pools.

Since energy(A) is expressed as a sum of n terms for the contracts (in the cost term) and m terms for the pools (in the pool-quality term), and since a typical "move" as described below involves only one contract and at most two pools, changes in energy can be computed locally. I.e., once the energy of an initial configuration has been computed, the energy of a new configuration can be found by using data from the one contract and the two pools involved.

Acceptance Test for an Allocation. Given an allocation A, a move produces another allocation A' by some chosen strategy, e.g., involving one contract and two pools. In a simulated annealing algorithm, in contrast to a greedy algorithm, A' will be accepted as a possible replacement for A not only if cost(A')<cost(A) but also if a more liberal probabilistic test is met. As an example of such a test, an allocation A' may be accepted at a current "temperature" value T if, with $$\Delta = \text{cost}(A') - \text{cost}(A),$$

and for a number r chosen at random in the interval [0, 1], $$r < e^{-\Delta/T}$$

More specifically, this acceptance test can be described in terms of program steps as follows:

1. Given a current temperature T, a current allocation A, and a tentative replacement allocation A', obtain a "random number", r, in the interval from 0 to 1, e.g., by calling upon a programmed generator of pseudo-random numbers.
2. Calculate the quantity $q = e^{-\Delta/T}$.
3. Compare q with r and declare A' an acceptable replacement for A if and only if r<q.

It is noted that, if cost(A')<cost(A), then $\Delta$<0 and thus q>1. Since, as chosen, r≦1, it follows that r<q independent of the value of r in this case, so that A' will be found acceptable.

If, on the other hand, cost A'≧cost A, then $\Delta$≧1 and q≦1. Thus, in this second case, the outcome of the comparison of r with q in step 3 above may be positive or negative depending on probability, and the greater the value of q, the greater the likelihood of acceptance with r<q. Because q is directly related to temperature and indirectly to $\Delta$, acceptance is the more likely the greater the temperature and the smaller the value of $\Delta$. At a constant temperature, the smaller the value of $\Delta$, the greater the likelihood of acceptance. And, as the temperature is lowered in the process of simulated annealing, the probability of acceptance of allocations with large $\Delta$-values decreases.

Underlying the described specific acceptance test is the assumption of a Boltzmann probability distribution of energy. Other suitable tests can be devised based on considerations of likelihood of acceptance as a function of temperature and of cost difference.

Computation of an Initial Temperature. A preferred initial temperature parameter can be found as follows: a number $\epsilon$ is chosen, smaller by an order of magnitude than the smallest positive term in the sums defining cost(A). From a starting allocation, A, a small number of random moves (100, for example) is made at T=$\epsilon$, and each derived allocation A' is tested for acceptance as described, for example. At this point the percentage of acceptable allocations will be low as, for T=$\epsilon$, the system is essentially "frozen" (i.e., few if any higher-cost allocations A' would be accepted at this temperature). The described procedure is now repeated with T=2$\epsilon$, 4$\epsilon$, 8$\epsilon$, and so on, until a significant percentage of acceptances is realized, e.g., 90 percent. At this point the system may be considered as "melted", and "cooling" (i.e., lowering of the temperature parameter) may start.

This relatively quick and simple method of computing an initial temperature ensures that (i) annealing will start when the system is indeed melted, and (ii) the temperature is not much higher than the minimum needed for melting. These conditions are favorable for efficient movement of the system from the melted to a frozen state, without excessive time at the high-temperature stage. The described procedure for choosing an initial temperature is a variant of one described by P. J. M. van Laarhoven et al., "Simulated Annealing: Theory and Applications", Kluwer Academic, 1987. Another suitable procedure, based on the assumption that the cost of allocations follows a Gaussian distribution, is described by S. R. White, "Concepts of Scale in Simulated Annealing", Proceedings of the IEEE International Conference on Computer Design, Port Chester, November 1984, pp. 646–651.

Computation of an Initial Allocation. The following may be used as a fast heuristic starting procedure:

For j=1, 2, . . . , n:
1. Sort pools by their current value.
2. Define X=Amount($C_j$)/Max_Pools_Allowed($C_j$).
3. From the sorted pool list, allocate to $C_j$ up to n−1 of the largest pools whose current value is less than X.
4. Find a pool which is large enough to split for filling the remaining amount of $C_j$.
5. Decrement pool values to reflect the allocation to $C_j$ made in steps 3 and 4.

In performing steps 3 and 4, constraints on the tails, pool fragments, etc. are observed. This algorithm is designed to favor the allocation from small pools and to delay the use of large pools. Each iteration involves sorting, for which a simple sorting algorithm may be used, e.g., bubble sort. Preferably, however, if double-linked lists are used as the underlying data structure, sorting need be performed only once, at the beginning of the algorithm, followed by local updating.

Generation of New Allocations. A simple transformation or move, to obtain a new allocation matrix A' from a current allocation matrix A, can be described as follows: Randomly choose contract $C_j$ and two pools $P_i$ and $P_k$. If neither $P_i$ nor $P_k$ is currently used to satisfy contract $C_j$, allocate to $C_j$ some amount $a_{i,j}$ from $P_i$. If pool $P_i$ is currently used to deliver an amount $a_{i,j} > a_{k,j}$ to contract $C_j$, take some amount $X \leq a_{i,j}$ and allocate that amount from pool $P_k$. It is noted that it may not be possible to reallocate the exact amount X, because pool $P_k$ will typically have a different factor and tail than pool $P_i$, but it may be possible to allocate an amount X' close to X from pool $P_k$ to contract $C_j$. Decrementing of the current value of $P_k$, and incrementing of the current value of $P_i$ completes the move.

This move involves at most two pools and one contract. This means that saving/restoring an allocation, and generating a new one can be done very efficiently just by modifying a few entries of the allocation matrix. As to the number of moves per temperature level, this number may be fixed, e.g., as directly dependent on the number of pools and the number of contracts. Further suggestions in this respect can be found in the paper by E. Bonomi et al., "The N-city Travelling Salesman Problem: Statistical Mechanics and the Metropolis Algorithm", SIAM Review, Vol. 26 (1986), pp. 551–568 and in the cited paper by S. Kirkpatrick et al.

Cooling Schedule. Temperature reduction steps may be taken, e.g., by replacing a current value T of the temperature parameter with a value $\alpha \cdot T$, where $\alpha$ is a constant smaller than and close to 1. Typically, $\alpha$ may be chosen in the interval from 0.8 to 0.95; see, e.g., the cited paper by E. Bonomi et al. While constant $\alpha$=0.9 was found to be satisfactory in experiments, variations are not precluded, e.g., smaller values at the beginning and/or in the final stages of the algorithm.

Experimental Results. Tests of an implementation of the described simulated annealing procedure were performed on an IBM RS/6000 work-station computer with several sets of sample data for mortgage pool allocation. Temperature decrease was by a factor 0.9 throughout. The procedure was halted as soon as a temperature level was reached at which no acceptable move was generated. Experiments were carried out with different numbers of attempted moves at any one temperature; a number directly proportional to the number of pools plus the number of contracts (m+n) was found to be appropriate in the tests. The same number of moves was attempted at each temperature level. The pool weights ($w_i$) were all set to zero, i.e., no pool preferences were specified. Some of the larger sample data sets had more than 500 pools and more than 500 contracts. The contracts represented approximately $550,000,000. The program obtained good solutions in under 2.5 minutes running time.

The method proved to be sensitive to the ratio of the total money in the pools to the money needed to fill all the contracts. When this ratio is large, there is greater flexibility in finding better allocations, and the algorithm is more effective in producing a lower-cost allocation.

We claim:

1. A computer-implemented method for allocation of securities from a plurality of security pools to a plurality of contracts, the allocation being subject to a plurality of constraints and to optimization of an objective function, comprising:

inputting to a computerized rule-based system a first representation of securities pool information, a second representation of contract information, a third representation of constraint information, and a fourth representation of control information, generating, as a first allocation with a first objective function value, for a sequence of allocations with corresponding objective function values, an initial allocation of securities satisfying the constraints and having an initial objective function value, iteratively generating at least one further allocation in the sequence of allocations, the further allocation satisfying the constraints and having a further objective function value which is improved as compared with a preceding allocation in the sequence of allocations, and displaying the further allocation as a last allocation if a stopping criterion is satisfied.

2. The method of claim 1, wherein the first allocation of the sequence is an empty allocation.

3. The method of claim 1, wherein the value of the objective function for the last allocation of the sequence differs from the value of the objective function for a preceding allocation by less than a predetermined amount.

4. The method of claim 1, wherein one of the sequence of allocations differs from a preceding allocation in the sequence by an amount allocated from a single one of the securities pools.

5. The method of claim 1, wherein one of the sequence of allocations differs from a preceding allocation in the sequence by amounts allocated from more than one of the securities pools.

6. The method of claim 1, wherein each securities pool consists of mortgage-backed securities.

7. The method of claim 6, wherein one of the sequence of allocations differs from a preceding allocation in the sequence by a sum of money.

8. The method of claim 6, wherein one of the allocations uses up the exact amount remaining in a pool.

9. The method of claim 6, wherein a sum of money is allocated as a sum from two of the plurality of securities pools.

10. The method of claim 6, wherein a sum of money is allocated as a sum from three of the plurality of securities pools.

11. The method of claim 6, wherein forming a sum of money comprises splitting one of the plurality of securities pools.

12. The method of claim 6, further comprising a step of exchanging a sum of money from one of the plurality of contracts with a sum of money from another one of the plurality of contracts.

13. A computer system for allocation of securities from a plurality of securities pools to a plurality of contracts, the allocation being subject to a plurality of constraints and to optimization of an objective function, comprising:

input means for inputting a first representation of securities pool information, a second representation of contract information, a third representation of constraint information, and a fourth representation of control information, rule-based processing means:

for generating, as a first allocation with a first objective function value, for a sequence of allocations with corresponding objective function values, an initial allocation of securities satisfying the constraints and having an initial objective function value, and for iteratively generating at least one further allocation in the sequence of allocations, the further allocation satisfying the constraints and having a further objective function value which is improved as compared with a preceding allocation in the sequence of allocations, and display means for displaying the further allocation as a last allocation if a stopping criterion is satisfied.

14. A computer-implemented method for allocation of securities from a plurality of securities pools to a plurality of contracts, assignment being subject to a plurality of constraints and to optimization of an objective function, comprising inputting to a computerized system a first representation of securities pool information, a second representation of contract information, a third representation of constraint information, and a fourth representation of control information, and generating a decreasing sequence of positive parameter values, and a corresponding sequence of allocations, comprising choosing each one of the sequence of allocations either (i) as providing an improved value of the objective function as compared with a preceding allocation in the sequence, or (ii) as passing a probabilistic acceptance test for a probability associated with the allocation which is directly related to the corresponding parameter value, and indirectly related to the magnitude of the difference of the value of the objective function of the allocation and the value of the objective function of a preceding allocation in the sequence, and displaying a final allocation when a stopping criterion is met.

15. The method of claim 14, wherein the sequence of parameter values has a first value for which the probabilistic acceptance test is passed by a predetermined minimum number of allocations produced by a chosen procedure for generating allocations.

16. The method of claim 14, wherein the sequence of allocations has a first allocation whose determination comprises:

inputting to a computerized rule based system the first representation of securities pool information, the second representation of contract information, and the third representation of constraint information, and generating a sequence of securities allocations each of which satisfies the constraints, and each of which provides an improved objective function value as compared with a preceding securities allocation in the sequence.

17. The method of claim 14, wherein one of the sequence of allocations differs from a preceding allocation in the sequence with respect to one contract and at most two pools.

18. The method of claim 14, wherein each one of the sequence of parameter values is obtained from a preceding parameter value in the sequence by multiplication of the preceding parameter value with a constant in the range from 0.8 to 0.95.

19. The method of claim 14, wherein the sequence of allocations is terminated when, for a last parameter value, none of a predetermined number of attempted allocations passed the probabilistic acceptance test.

20. The method of claim 14, wherein the sequence of allocations is terminated when the objective function of an allocation is acceptable by comparison with a preset value.

21. The method of claim 14, wherein the sequence of allocations is terminated when computer processing has reached a preset time limit.

22. The method of claim 14, wherein the sequence of allocations is terminated by human intervention.

23. A computer system for allocation of securities from a plurality of securities pools to a plurality of contracts, the allocation being subject to a plurality of constraints and to optimization of an objective function, comprising input means for inputting to a computerized system a first representation of securities pool information, a second representation of contract information, a third representation of constraint information, and a fourth representation of control information, and processing means for generating a decreasing sequence of positive parameter values, and a corresponding sequence of allocations, each allocation being chosen either (i) as providing an improved value of the objective function as compared with a preceding allocation in the sequence, or (ii) as passing a probabilistic acceptance test for a probability associated with the allocation which is directly related to the corresponding parameter value, and indirectly related to the magnitude of the difference of the value of the objective function of the allocation and the value of the objective function of a preceding allocation in the sequence, and display means for displaying a final allocation when a stopping criterion is met.

* * * * *

UNITED STATES PATENT AND TRADEMARK OFFICE
CERTIFICATE OF CORRECTION

PATENT NO. : 5,563,783
DATED : October 8, 1996
INVENTOR(S) : Salvatore J. Stolfo et al.

It is certified that error appears in the above-indentified patent and that said Letters Patent is hereby corrected as shown below:

Column 1, line 3, "continuation" should read -- continuation of --.

Column 6, line 27, that portion of the equation reading "$1 \leq j < n$" should read -- $1 \leq j \leq n$ --.

Column 11, line 36, "to A" should read -- to $\Delta$ --.

Signed and Sealed this

Thirtieth Day of September, 1997

Attest:

BRUCE LEHMAN

Attesting Officer

Commissioner of Patents and Trademarks